United States Patent
Takizawa

(10) Patent No.: US 6,741,285 B2
(45) Date of Patent: May 25, 2004

(54) APPARATUS WHICH ADJUSTS EXPOSURE ON LUMINANCE VALUE OF PHOTOELECTRICALLY CONVERTED IMAGE PICKUP SCREEN

(75) Inventor: Junichi Takizawa, Saitama (JP)

(73) Assignee: Eastman Kodak Company, Rochester, NY (US)

( * ) Notice: Subject to any disclaimer, the term of this patent is extended or adjusted under 35 U.S.C. 154(b) by 346 days.

(21) Appl. No.: 09/803,590

(22) Filed: Mar. 9, 2001

(65) Prior Publication Data

US 2002/0018141 A1 Feb. 14, 2002

(30) Foreign Application Priority Data

Aug. 9, 2000 (JP) ........................................ 2000-240931

(51) Int. Cl.[7] .......................... H04N 5/238; H04N 5/235
(52) U.S. Cl. ........................ 348/364; 348/234; 348/362; 348/363
(58) Field of Search ................................. 348/234, 235, 348/236, 237, 238, 362, 363, 364, 365

(56) References Cited

U.S. PATENT DOCUMENTS

| | | | | |
|---|---|---|---|---|
| 5,049,997 A | * | 9/1991 | Arai | ........................... 348/364 |
| 5,926,562 A | * | 7/1999 | Hyodo et al. | ................ 382/167 |
| 6,040,858 A | * | 3/2000 | Ikeda | ......................... 348/242 |
| 6,480,226 B1 | * | 11/2002 | Takahashi et al. | .......... 348/296 |

* cited by examiner

Primary Examiner—Wendy R. Garber
Assistant Examiner—Timothy J Henn
(74) Attorney, Agent, or Firm—Pamela R. Crocker

(57) ABSTRACT

At the time of preliminary photographing for exposure adjustment, an image pickup screen is divided into n blocks S100 and color decision processing is executed for sorting each block into a block belonging to monochromatic light and a block belonging to light other than the monochromatic light S102. A reference luminance value LSi (LSi=(Ri+2Gi+Bi)/4) is set for the block belonging to the light other than the monochromatic light as a luminance value Li of the block S104 and a higher value than the reference luminance value LSi is set for the block belonging to the monochromatic light as the luminance value Li S106. Then, exposure is adjusted so that an average E of this luminance value Li can match a target luminance value X (reflectivity of 18%) S108, S110. Accordingly, the monochromatic light can be prevented from being displayed more brightly than needed, and, as a result, photographing is enabled with a more appropriate exposure.

6 Claims, 4 Drawing Sheets

| 1.5 | 1.4 | 1.3 | 1.3 | 1.3 | 1.3 | 1.3 | 1.3 | 1.3 | 1.3 | 1.4 | 1.5 |
|---|---|---|---|---|---|---|---|---|---|---|---|
| 1.5 | 1.4 | 1.3 | 1.2 | 1.2 | 1.2 | 1.2 | 1.2 | 1.2 | 1.3 | 1.4 | 1.5 |
| 1.5 | 1.4 | 1.3 | 1.2 | 1.1 | 1.1 | 1.1 | 1.1 | 1.2 | 1.3 | 1.4 | 1.5 |
| 1.5 | 1.4 | 1.3 | 1.2 | 1.1 | 1.0 | 1.0 | 1.1 | 1.2 | 1.3 | 1.4 | 1.5 |
| 1.5 | 1.4 | 1.3 | 1.2 | 1.1 | 1.0 | 1.0 | 1.1 | 1.2 | 1.3 | 1.4 | 1.5 |
| 1.5 | 1.4 | 1.3 | 1.2 | 1.1 | 1.1 | 1.1 | 1.1 | 1.2 | 1.3 | 1.4 | 1.5 |
| 1.5 | 1.4 | 1.3 | 1.2 | 1.2 | 1.2 | 1.2 | 1.2 | 1.2 | 1.3 | 1.4 | 1.5 |
| 1.5 | 1.4 | 1.3 | 1.3 | 1.3 | 1.3 | 1.3 | 1.3 | 1.3 | 1.3 | 1.4 | 1.5 |

FIG. 4

APPARATUS WHICH ADJUSTS EXPOSURE ON LUMINANCE VALUE OF PHOTOELECTRICALLY CONVERTED IMAGE PICKUP SCREEN

BACKGROUND OF THE INVENTION

1. Field of the Invention

The present invention relates to an apparatus which adjusts exposure using luminance values of a plurality of blocks consisting of at least one pixel that constitute a photoelectrically converted image pickup screen.

2. Description of the Related Arts

Up to now, an apparatus of this type which adjusts exposure so that an average luminance value of an image pickup screen at the time of photometry can reach a target luminance value (luminance value for reflectivity of 18%) has been proposed. In this apparatus, after luminance values of a plurality of blocks which constitute the image pickup screen have been respectively calculated, photographing is enabled with an appropriate exposure by obtaining these averages as an average luminance value and adjusting exposure so that this average luminance value can reach the target luminance value. Moreover, in addition to this, an apparatus (for example, Japanese Patent Publication No. Hei 7-26874) which tries to realize accurate photometry by performing preliminary photometry and practical photometry so that the luminance range of an object screen can be within the luminance range in which photometry of a CCD is enabled is also proposed.

However, in such apparatus, monochromatic light may be displayed more brightly than needed. This is based on the fact that as the proportion of monochromatic light (for example, red) to an image pickup screen at the time of photometry increases, an average luminance value of the image pickup screen decreases and exposure is adjusted so that this average luminance value can reach a target luminance value. This becomes a cause which results in the color saturation of a display apparatus such as a CRT, and a sense of incompatibility may be generated in those who watch this display apparatus. Further, there was a drawback that if achromatic light, for example, a white portion (reflectivity of about 90%) can be seen in an image pickup screen at the time of photometry, white is displayed darkly due to the correction of exposure to a target luminance value, and, conversely, if a black portion (reflectivity of about 3%) can be seen in the image pickup screen, black is displayed brightly due to the correction of exposure.

SUMMARY OF THE INVENTION

An object of an apparatus of the present invention is to enable photographing with a more appropriate exposure.

An apparatus of the present invention employs the following means to attain the aforementioned object.

A first apparatus of the present invention is an apparatus for adjusting exposure using luminance values of a plurality of blocks consisting of at least one pixel that constitute a photoelectrically converted image pickup screen, comprising reference luminance value calculating means which calculates reference luminance values of the plurality of blocks sorting means which sorts the plurality of blocks into blocks belonging to monochromatic light and blocks belonging to light other than the monochromatic light luminance value setting means which sets higher values than the reference luminance values calculated by the reference luminance value calculating means as the luminance values of the blocks belonging to the monochromatic light among the sorted plurality of blocks and sets the reference luminance values calculated by the reference luminance value calculating means as the luminance values of the blocks assigned to the light other than the monochromatic light; and exposure adjusting means which adjusts exposure based on the set luminance values.

In a first apparatus of the present invention, reference luminance value calculating means calculates reference luminance values of a plurality of blocks, and sorting means sorts a plurality of blocks into blocks belonging to monochromatic light and blocks belonging to the light other than the monochromatic light. Then, luminance value setting means sets higher values than the reference luminance values calculated by the reference luminance value calculating means as the luminance values of the blocks belonging to the monochromatic light from the plurality of blocks sorted by the sorting means, sets the reference luminance values calculated by the reference luminance value calculating means as the luminance values of the blocks belonging to the light other than the monochromatic light and exposure adjusting means adjusts exposure based on the set luminance values. According to this first apparatus of the present invention, since the luminance values of the blocks assigned to the monochromatic light are set higher than the reference luminance values and exposure is adjusted based on these set luminance values, the monochromatic light can be prevented from being brighter than needed, and, as a result, photographing is enabled with a more appropriate exposure.

In such a first apparatus of the present invention, the sorting means can also be made a means which sorts a plurality of blocks based on signal ratios of RGB (red, green and blue) signals in the blocks.

Further, in the first apparatus of the present invention, the luminance value setting means can also be made a means of setting the maximum signal value among elements of RGB signals as the luminance values of the blocks belonging to the monochromatic light.

A second apparatus of the present invention is an apparatus for adjusting exposure using luminance values of a plurality of blocks consisting of at least one pixel that constitute a photoelectrically converted screen, comprising sorting means which sorts the plurality of blocks into at least two groups using a threshold regarding a predetermined color luminance value correction means which corrects the luminance values of the plurality of blocks using a predetermined weight which corresponds to the sorted groups; and exposure adjusting means which adjusts the exposure based on the corrected luminance values.

In the second apparatus of the present invention, sorting means sorts a plurality of blocks into at least two groups using a threshold regarding a predetermined color, and luminance value correcting means corrects luminance values of a plurality of blocks using a predetermined weight which corresponds to the sorted groups. Then, exposure adjusting means adjusts exposure based on corrected luminance values. According to this second apparatus of the present invention, since luminance values are corrected in accordance with the color information of an image pickup screen, photographing is enabled with a more appropriate exposure in accordance with the conditions of an object.

In a second apparatus of the present invention, the sorting means can also be made a means which sorts a plurality of blocks based on signal ratios of RGB signals in the blocks.

Moreover, in a second apparatus of the present invention, the threshold regarding the predetermined color can be a threshold in which a plurality of blocks are sorted into a block belonging to achromatic light, a block belonging to monochromatic light and a block belonging to normal light other than the achromatic light and the monochromatic light. In the second apparatus of the present invention according to this aspect, the luminance value correcting means can be a means which uses a great weight in the order of the block belonging to the achromatic light, the block belonging to the normal light and the block belonging to the monochromatic light. Thus, since exposure is adjusted by preferentially evaluating an object having a tone and low evaluating the achromatic color, the effect caused by the achromatic light can be reduced when adjusting the exposure, and, as a result, photographing is enabled with a more appropriate exposure.

BRIEF DESCRIPTION OF THE DRAWINGS

FIG. 4 is an illustration showing an example of compensation gains in a peripheral portion.

DESCRIPTION OF PREFERRED EMBODIMENTS

Figure 1:
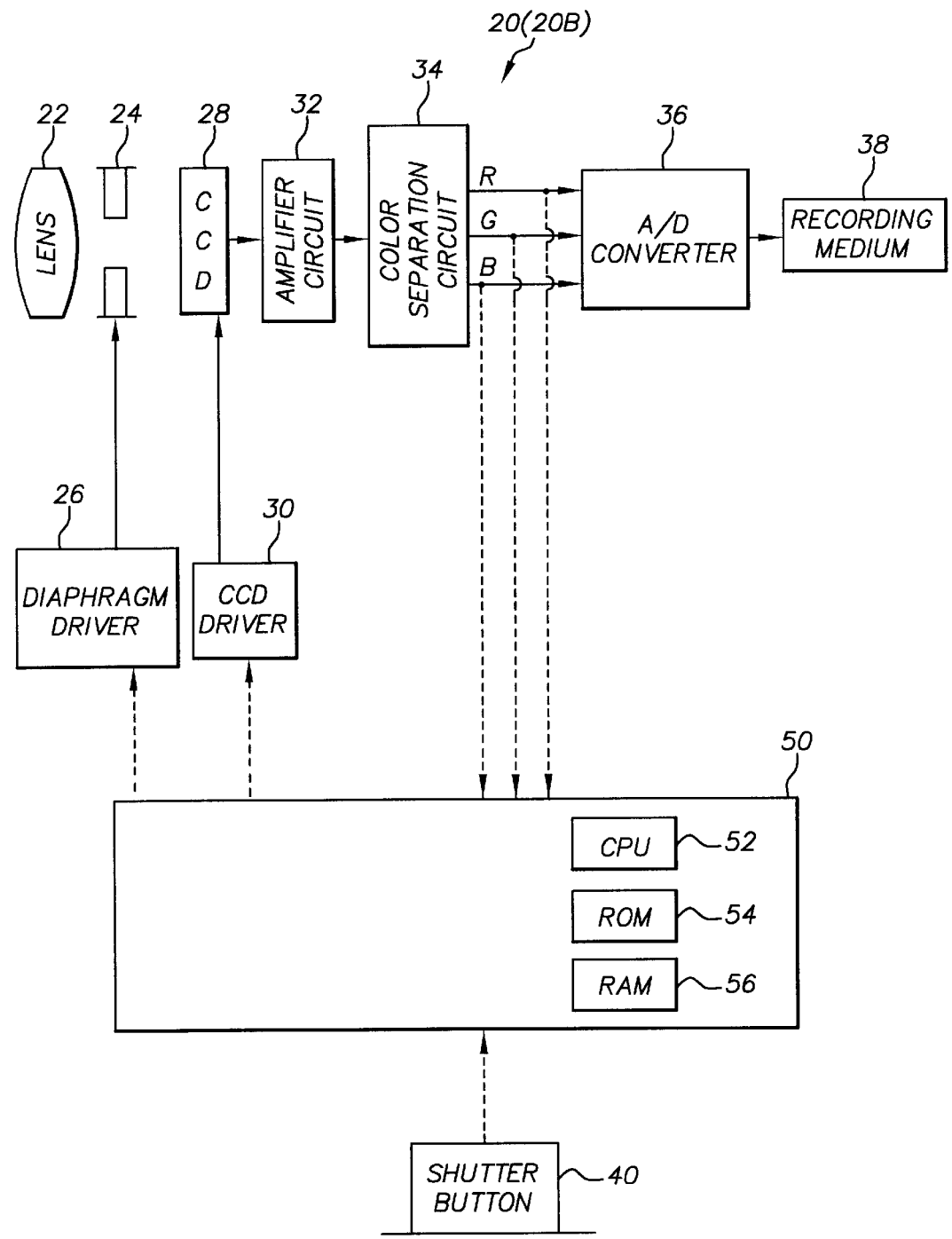
FIG. 1 is a block diagram showing an outline of each configuration of apparatuses 20 and 20B according to one embodiment of the present invention.

Next, the embodiments of the present invention will be described using examples. FIG. 1 is a block diagram showing an outline of the configuration of an apparatus 20 which is an embodiment of the present invention. The apparatus 20 according to the embodiment is constructed so that practical photographing can be performed after exposure has been adjusted (adjustment of a release time or a diaphragm value) based on a luminance value of an image pickup screen which was photographed by the preliminary photographing for exposure adjustment, and comprises a shutter button 40 which operates as a photographing start command by an operator, a lens 22 which catches an image of an object, a diaphragm 24 which adjusts exposure, a CCD 28 as a solid-state image sensor which generates an electric signal in accordance with the exposure adjusted by the diaphragm 24, an amplifier circuit 32 which amplifies the generated electric signal, a color separation circuit 34 which separates the amplified electric signal into RGB signals and a controller 50 which processes the RGB signals generated by the color separation circuit 34 at the time of preliminary photographing and controls the whole apparatus. Besides, after the RGB signals generated by the color separation circuit 34 at the time of practical photographing have been converted into digital signals by an A/D converter 36, they are recorded in a recording medium 38.

The controller 50 is constructed as a microprocessor which has a CPU 52 at its center, and comprises a ROM 54 which stores a processing program, a RAM 56 which temporarily stores data and an I/O port (not illustrated). A photographing command signal from the shutter button 40 and RGB signals from the color separation circuit 34 are input to this controller 50 via the input port and a diaphragm driving signal to a diaphragm driver 26 and a CCD driving signal to a CCD driver 30 are output from the controller 50 via the output port.

Figure 2:
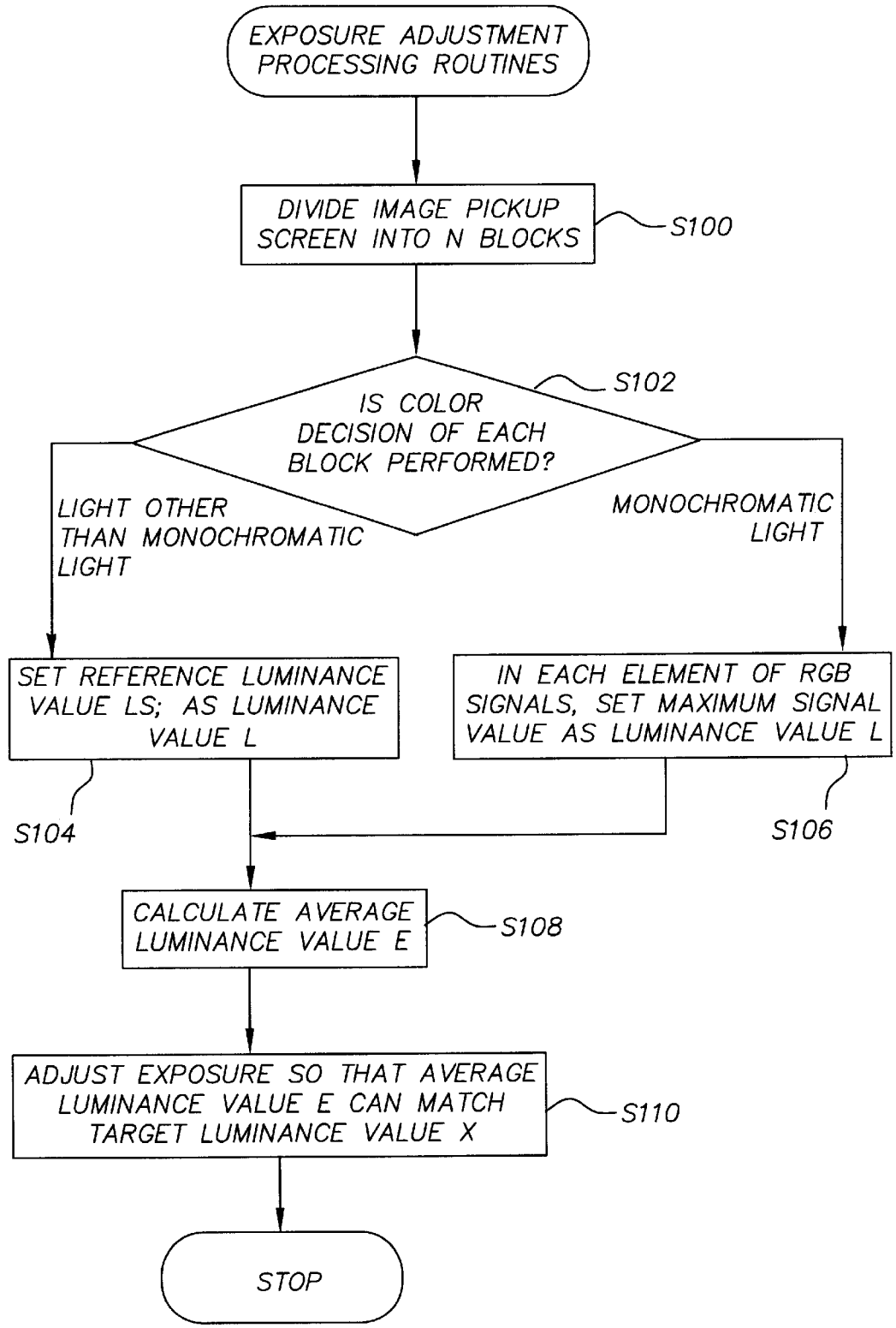
FIG. 2 is a flowchart showing an example of an exposure adjustment processing routine executed by a controller 50 of the apparatus 20 according to a first embodiment of the present invention.

The operation of the apparatus 20 comprised in this way, in particular, the operation which adjusts exposure based on a luminance value of an image pickup screen at the time of preliminary photographing, will now be described. FIG. 2 is a flowchart showing an example of an exposure adjustment processing routine executed by the CPU 52 of the controller 50. This routine is executed when photographing is started according to the operation of the shutter button 40 by an operator and RGB signals generated by the color separation circuit 34 are input at the time of preliminary photographing for exposure adjustment.

When an exposure adjustment processing routine is executed, the CPU 52 of the controller 50 first divides an image pickup screen into n blocks (for example, blocks of 8 high×12 wide (n=96)) (Step S100) and performs color decision processing for sorting these blocks into blocks belonging to monochromatic light and blocks belonging to the light other than the monochromatic light (Step S102). This processing decides the blocks belonging to the monochromatic light and the blocks belonging to the light other than the monochromatic light based on the signal ratios between the respective elements of the RGB signals of a pixel which constitutes a block. In the example, assume that the average signal values of every elements of the RGB signals of a plurality of pixels which comprise blocks are $Ri$, $Gi$, $Bi$ ($i=1, \ldots, n$) respectively. Then, as shown in the next formula (1), if a signal ratio $RTi$ calculated from the ratio of the maximum signal value to the minimum signal value in $Ri$, $Gi$, $Bi$ is higher than a threshold TM, it is judged that the blocks belong to the monochromatic light, and, if the ratio is lower than the threshold TM, it is judged that the blocks belong to the light other than the monochromatic light. In this case, the threshold TM is a threshold in which a plurality of blocks are sorted into the blocks belonging to the monochromatic blocks and the blocks belonging to the light other than the monochromatic light, and, for example, the threshold is set as TM=2.0.

$$RTi = MAX(Ri, Gi, Bi)/MIN(Ri, Gi, Bi) \qquad (1)$$

As a result of such processing, regarding a block judged to belong to the light other than the monochromatic light, a reference luminance value $LSi$ (for example, $LSi=(Ri+2Gi+Bi)/4$) is calculated from the average RGB signal values of a plurality of pixels which constitute the block and this reference luminance value $LSi$ is set as a luminance value $Li$ (Step S104). On the other hand, regarding a block judged to belong to the monochromatic light, a higher value than the reference luminance value $LSi$ calculated in this block is set. In the example, the maximum signal value (MAX ($Ri$, $Gi$, $Bi$)) of each element of the RGB signals is set as the luminance value $Li$ (Step S106).

Thus, when the luminance value $Li$ is set regarding all blocks, an average luminance value E ($E=\Sigma Li/n$) is calculated by averaging the luminance value $Li$ set every specified number of blocks (Step S108), and this routine is completed by adjusting exposure (Step S110) so that this average luminance value E can match a target luminance value X (for example, a luminance value which corresponds to 18% of the maximum luminance value which can be represented), that is, a luminance difference $\Delta E$ ($\Delta E = \text{Log } 2 (X/E)$) can reach zero. For the adjustment of this exposure, in the example, the relationship between a release time or a diaphragm value and the variation (luminance difference ΔE) of a luminance value is stored in the ROM 54 as a map, and when the luminance difference ΔE is assigned, the release time or the diaphragm value which corresponds to the map is assigned.

According to the apparatus 20 of the present invention described above, regarding the block belonging to the monochromatic light at the time of the exposure adjustment based on a luminance value, since a higher value than the reference luminance value LSi is set, the monochromatic light can be prevented from being brighter than needed and exposure can be adjusted more appropriately than before.

In the apparatus 20 of the present invention, regarding a block judged to belong to monochromatic light, the maximum signal value (MAX (Ri, Gi, Bi)) in each element of RGB signals as a luminance value is set. If a higher value than the reference luminance value LSi of a block belonging to the monochromatic light can be set as a luminance value, it may be set in any method.

Next, the apparatus 20B according to the second embodiment of the present invention will be described. The hardware configuration of the apparatus 20B of the second embodiment is the same as the hardware configuration of the apparatus 20 of the first embodiment. Accordingly, the same symbols as used in the configuration of the first embodiment are used and the description of these parts is omitted.

Figure 3:
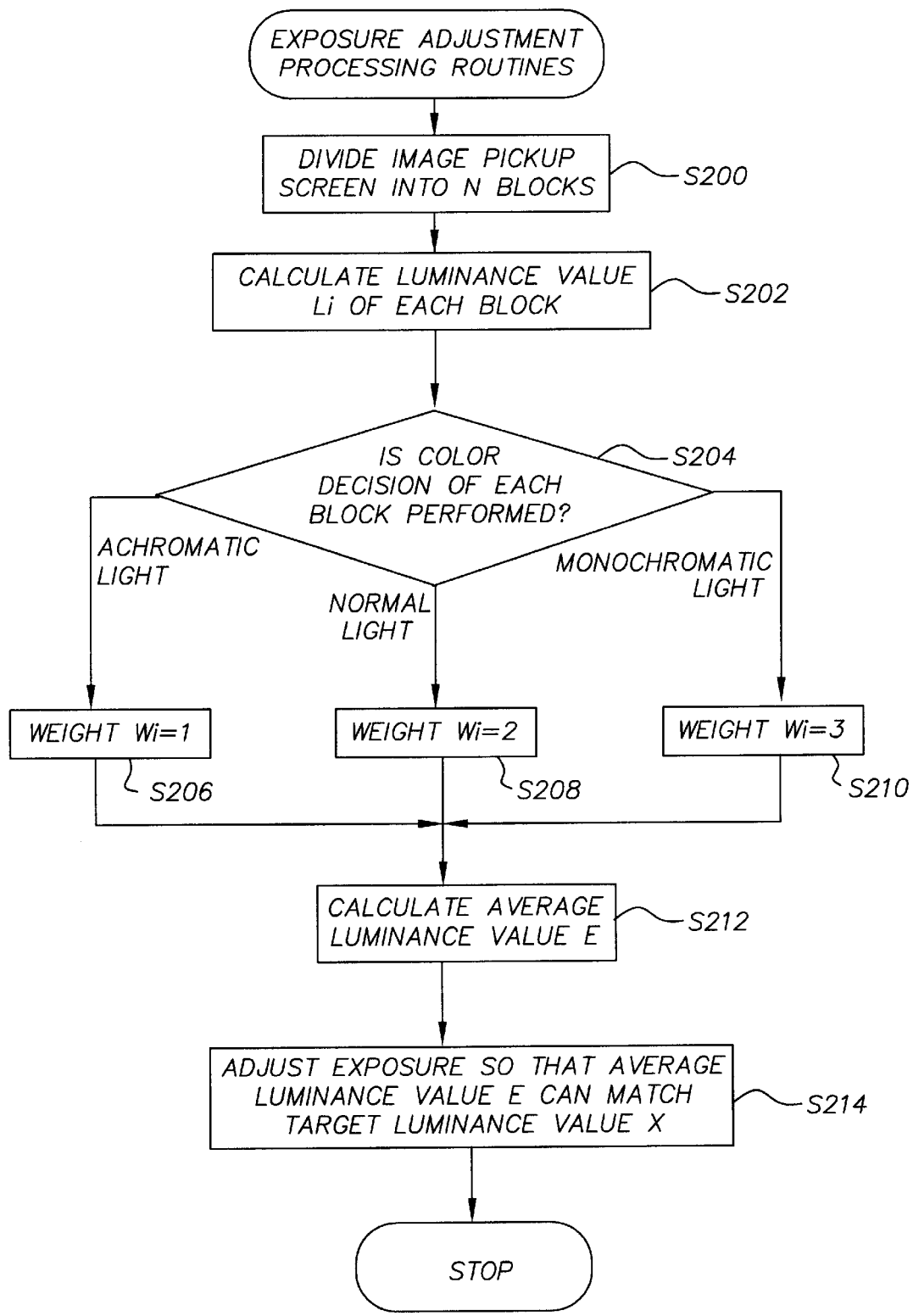
FIG. 3 is a flowchart showing an example of an exposure adjustment processing routine executed by the controller 50 of the apparatus 20B according to a second embodiment of the present invention.

In the apparatus 20B of the second embodiment, the exposure adjustment processing routine of FIG. 3 is executed instead of the exposure adjustment processing routine of FIG. 2. When the exposure adjustment processing routine of the second embodiment is executed, the CPU 52 of the controller 50 performs the same block split processing as the processing of Step S100 in the routine of FIG. 2 (Step S200), the luminance value Li (for example, Li=(Ri+2Gi+Bi)/4) is calculated every specified number of blocks (Step S202) and color decision processing for grouping each block is performed (Step S204). This processing decides that each block is any of a block belonging to achromatic light, a block belonging to monochromatic light and a block belonging to normal light other than the achromatic light and the monochromatic light. In the example, if the signal ratio RTi (Formula (1)) calculated in Step S102 of the exposure adjustment processing routine of FIG. 2 which is a first embodiment is determined to be lower than a threshold TG, it is judged to be achromatic light, and, when it is determined to be higher than the threshold TM, it is judged to be monochromatic light. Then, if the signal ratio RTi is determined to be higher than the threshold TG and lower than the threshold TM, it is judged to be normal light. In this case, the threshold TG is a threshold in which a plurality of blocks are sorted into blocks of achromatic light and blocks of normal light, and, for example, the threshold is set to TG=1.1. The threshold TM is a threshold in which a plurality of blocks are sorted into blocks of normal light and blocks of monochromatic light and, for example, the threshold is set to TM=2.0.

When the color decision processing of each block is performed in this manner, this routine is terminated by multiplying a large weight Wi (for example, 1, 2, 3) in the order of a block of achromatic light, a block of normal light and a block of monochromatic light (Steps S206 to S210), calculating an average luminance value E (E=ΣLi×Wi/ΣWi) of an image pickup screen in which this weight Wi was taken into account (Step S212) and adjusting the exposure (Step S214) so that this average luminance value E can match a target luminance value. Besides, the weight Wi is determined in accordance with a method of the color decision of a block or a threshold which sorts the blocks belonging to each color.

According to the apparatus 20B of the second embodiment described above, since exposure is adjusted by preferentially evaluating monochromatic light and normal light, photographing is enabled with a more approximate exposure when taking a color photograph. Besides, since achromatic light is evaluated low, when a luminance value is corrected, the effect of the achromatic light can be reduced, that is, such a state where white is darkly represented or black is brightly represented can be prevented.

In the apparatus 20B of the second embodiment of the present invention, although a plurality of blocks which constitute an image pickup screen are sorted into three groups consisting of blocks of monochromatic light, blocks of achromatic light and blocks other than these blocks, they may be sorted into any number of groups if they are multiple. For example, they may also be sorted into two groups consisting of blocks of the achromatic light and blocks other than the achromatic light.

Besides, the apparatuses 20 and 20B of the first and second embodiments of the present invention can be combined for their configuration. This combination is enabled by adding the processing which corresponds to Steps S104 and S106 of the exposure adjustment processing routine of FIG. 2 after Step S202 of the exposure adjustment processing routine of FIG. 3. That is, according to the color decision processing in Step S204 of the exposure adjustment processing routine of FIG. 3, after each block has been sorted into a block of achromatic light, a block of normal light and a block of monochromatic light and the maximum signal value in each element of the RGB signals has been set as the luminance value Li, processing of multiplying by a weight corresponding to the block belonging to each color in Steps S206 to S210 is performed. Such combination allows photographing with a more appropriate exposure.

Further, in the apparatuses 20 and 20B of the first or second embodiment of the present invention, after an image pickup screen has been divided into a plurality of blocks, a luminance value is set according to the color decision of each block. As preprocessing performed before the color decision, a white balance is adjusted or the characteristics (dark characteristics of a peripheral portion) of a lens where the peripheral portion responds darkly compared with the central portion may also be compensated. In this case, photographing is enabled with a more appropriate exposure. Beside, FIG. 4 shows an example of the gain at which the dark characteristics of the peripheral portion are compensated.

Moreover, in the apparatus 20 and 20B of the first or second embodiment of the present invention, although each block is comprised of a plurality of pixels, each block may also be comprised of a single pixel.

So far, the embodiments of the present invention have been described using examples. Needless to say, the embodiments are not to be limited to these examples of the present invention, but they may be implemented in various forms within the scope in which they do not deviate from the details given herein.

Parts List

FIG. 1

26. Diaphragm driver
30. CCD driver
32. Amplifier circuit
34. Color separation circuit
36. A/D converter
38. Recording medium
50. Controller FIG. 2
A. Exposure adjustment processing routines
B. Other than monochromatic light
C. Monochromatic light
S100 Divide image pickup screen into N blocks
S102 Is color decision of each block performed?
S104 Set reference luminance value LSi as luminance value Li
S106 In each element of RGB Signals, set maximum signal value as luminance value Li
S108 Calculate average luminance value E
S110 Adjust exposure so that average luminance value E can match target luminance value X FIG. 3
A. Exposure adjustment processing routine
B. Achromatic light
C. Monochromatic light
D. Normal light
S200 Divide image pickup screen into N blocks
S202 Calculate luminance value Li of each block
S204 Is color decision of each block performed?
S206 Weight Wi=1
S208 Weight Wi=2
S210 Weight Wi=3
S212 Calculate average luminance value E
S214 Adjust exposure so that average luminance value E can match target luminance value X.

What is claimed is:

1. An apparatus which adjusts exposure using luminance values of a plurality of blocks consisting of at least one pixel that constitute a photoelectrically converted image pickup screen, comprising:

reference luminance value calculating means which calculates reference luminance values of the plurality of blocks;

sorting means which sorts the plurality of blocks into blocks belonging to monochromatic light and blocks belonging to light other than the monochromatic light;

luminance value setting means which sets higher values than the reference luminance values calculated by the reference luminance value calculating means as luminance values of the blocks belonging to the monochromatic light in the sorted plurality of blocks and sets the reference luminance values calculated by the reference luminance value calculating means as luminance values of the blocks belonging to the light other than the monochromatic light; and exposure adjusting means which adjusts exposure based on the set reference values.

2. The apparatus according to claim 1, wherein the sorting means sorts the plurality of blocks based on signal ratios of RGB signals in the plurality of the blocks.

3. The apparatus according to claim 1, wherein the luminance value setting means sets the maximum signal value in each element of the RGB signals as the luminance values of the blocks belonging to the monochromatic light.

4. An apparatus which adjusts exposure using luminance values of a plurality of blocks consisting of at least one pixel that constitutes a photoelectrically converted image pickup screen, comprising:

sorting means which sorts the plurality of blocks into blocks belonging to achromatic light, blocks belonging to monochromatic light and blocks belonging to normal light other than the achromatic light and the monochromatic light;

luminance correcting means which corrects the luminance values of the plurality of blocks using predetermined weights which correspond to the sorted groups; and exposure adjusting means which adjusts exposure based on the corrected luminance values.

5. The apparatus according to claim 4, wherein the sorting means sorts the plurality of blocks based on signal ratios of the RGB signals in the blocks.

6. The apparatus according to claim 4, wherein the luminance value correcting means use a large weight in the order of the blocks belonging to the achromatic light, the blocks belonging to the normal light and the blocks belonging to the monochromatic light.

* * * * *